Patented Apr. 9, 1940

2,196,595

UNITED STATES PATENT OFFICE 2,196,595

METHOD OF PURIFYING CAUSTIC

Irving E. Muskat, Akron, Ohio, assignor to Pittsburgh Plate Glass Company, Allegheny County, Pa., a corporation of Pennsylvania No Drawing. Application December 11, 1937, Serial No. 179,335

20 Claims. (Cl. 23—184)

This invention relates to the purification of various compounds by treatment with liquid ammonia. Of particular interest is the treatment of alkali metal hydroxides, especially sodium hydroxide, to remove undesired impurities which occur in these materials as an incident of their manufacture.

Caustic soda solutions, as initially produced in commercial processes, are relatively dilute solutions, the concentrations of which are, in general, from 8 to 12 percent by weight. These solutions are contaminated with a large number of impurities, such as sodium sulphate, sodium chloride, chlorates, iron, etc., which must be removed in order to produce a commercially satisfactory product.

Somewhere in the neighborhood of a 45-50 percent concentration is the point of minimum solubility of many of these impurities in caustic solution, and since the production of concentrated caustic is necessary in any event, the usual practice is to concentrate the impure caustic to this concentration and remove these impurities by settling and filtration.

If extreme purity is desired, crystallization of various hydrates of sodium hydroxide may be resorted to. For example, according to Patent No. 1,733,879 to Hooker and Marsh, the 50 percent filtered caustic liquor is diluted to approximately 39 percent, at which concentration the 3½ hydrate is caused to crystallize at a reduced temperature of 10° C. Approximately 50 percent of the caustic is crystallized. The impure mother liquor which contains the impurities cannot be satisfactorily purified and is sold as an impure product. The 3½ hydrate crystals are then melted and reconcentrated to 50 percent.

In all, these various manipulations entail such a large expenditure of time, labor, and money that electrolytic caustic which must be purified by such a process has been at a decided disadvantage in competing with caustic made by the ammonia-soda process. Even after purifying electrolytic caustic by means of these expensive crystallization processes, the final purified product is more corrosive than lime-soda caustic.

The preparation of a purified caustic is further complicated by the fact that it is extremely difficult to maintain purity after the caustic has been purified. Since caustic soda is corrosive, and readily contaminated, every manipulation through which the caustic is put after it has been purified results in contamination by reason of the fact that the caustic attacks the apparatus in which it is treated. Usually, it has been considered desirable to dehydrate the 50 percent caustic to produce 70-75 percent or even anhydrous caustic. The production of 70 percent caustic is usually carried out by vaporization at reduced pressures. Since the highly heated product corrodes the apparatus and becomes contaminated even with the best of equipment, the production of a 70 percent caustic having a purity equal to that of the initial 50 percent caustic from which it was produced has not been satisfactorily accomplished by any commercial process of which I am aware.

The purity of the product is even further reduced when concentration from 70 percent to the anhydrous state is attempted. Since evaporation, as carried out with dilute caustic, is no longer possible, the caustic is placed in cast iron pots and vigorously heated in an open flame. In order to drive off the last traces of water, temperature as high as 1100° F. must be resorted to. Again the corrosive nature of the caustic at these high temperatures is so great that it attacks the pot extensively. Sulphur must be added to precipitate the iron and even after complete dehydration, the caustic must be kept molten for many hours to allow the precipitated iron to settle out. Even with these operations, the commercial preparation of pure anhydrous caustic has been well nigh impossible. To my knowledge, there has been no process heretofore available or suggested which would produce commercial 70 percent or anhydrous caustic of a purity which even approximates that of a purified 50 percent solution.

In accordance with my invention, it has been found that a substantial removal of certain impurities present in solutions of the alkali metal hydroxides can be removed by treatment with liquid ammonia in the manner hereinafter set forth. By the term "liquid ammonia" in this application, it is intended to include anhydrous liquid ammonia and mixtures of ammonia and water which contain at least enough ammonia (in general, at least 65 percent) so as to insure the separation of a liquid phase consisting preponderantly of ammonia and water from an aqueous or hydrated solid or liquid phase or mixed phase consisting preponderantly of sodium hydroxide, when the ammonia and caustic phases are brought together.

I have discovered that if alkali metal hydroxides of high hydroxide content are intimately contacted or washed with such liquid ammonia, certain impurities, particularly the chloride and chlorates of these metals, are removed. In dealing with solutions which are substantially saturated with sodium chloride, as in the case of ordinary electrolytic caustic solutions, it is preferred to treat hydroxides of high concentration in which the solubility of sodium chloride is relatively low. When high concentrations of sodium hydroxide, for example, 40 percent or above, are treated with liquid ammonia, it is found that the sodium chloride content of the hydroxide recovered from the lower layer is substantially less than that of a solution of the same concentration which is saturated with sodium chloride. When 100 parts of a solution of low concentration, for example, 20–30 percent, which is substantially saturated with sodium chloride, is treated with 125 parts of liquid ammonia it is found, in general, that the hydroxide recovered from the lower layer is substantially saturated with sodium chloride. The amount of sodium chloride present in solutions of low concentration and the distribution ratio of the salt between the two liquid phases is such that addition of further quantities of ammonia does not result in a satisfactory purification. While the sodium chloride content of the caustic solution is decreased to some degree upon addition of more ammonia, substantial quantities of NaCl remain in solution, and if further amounts of ammonia are used, the concentrated phase disappears or becomes so small or so contaminated with solid that suitable purification can not be obtained. Most satisfactory removal of the sodium chloride and sodium chlorate appears to be obtained by treatment of solutions having an initial concentration of approximately 45–55 percent, the optimum concentration for purification by ammonia being approximately 50 percent. Where the liquid ammonia is substantially anhydrous or has a proportion of water less than that in equilibrium with the hydroxide under treatment and the hydroxide being treated is a hydrate or an aqueous solution, concentration as well as purification will occur and often it may be desirable to conduct the process to secure simultaneous purification and concentration of the solution. The concentration of the solution may be secured by various concentration methods, specific details of which have been described and claimed in my applications 93,022, filed July 28, 1936, and Serial No. 179,334, filed December 11, 1937. Purification of caustic by crystallization with ammonia is described in copending application Serial No. 179,336, filed December 11, 1937. Very often, however, it is desirable to purify alkali metal hydroxides, which may contain some quantity of water, without substantial concentration. The following is an example:

If caustic soda liquor of about a 50 percent concentration is treated with liquid ammonia containing about 70 percent liquid ammonia and 30 percent water which may be regarded as a mixture in equilibrium therewith as to water and caustic content the mixture will separate into an ammonia phase and a caustic phase. The ammonia phase being the lighter, will rise to the top of the mixture forming a top layer which rests upon a lower layer of caustic of about 50 percent concentration, (on the ammonia free basis). It will be understood that there is some partition of the caustic and the ammonia between the phases under these conditions, and by the expression "equilibrium mixture" as used in referring to the ammonia-water mixture and in the process, I mean the mixture containing ammonia and water in such proportions that, after contacting the caustic-water mixture, the relative proportions of caustic and water in the phase containing the preponderance of caustic on an ammonia-free basis will be substantially unchanged. When liquor, such as derived from the electrolysis of sodium chloride, and which contains sodium chloride, chlorates, and other impurities evolved during caustic production, is contacted with ammonia in this manner, the impurities distribute themselves between the two phases. The distribution ratio is such that only a minor portion or substantially none of the original sodium chloride and sodium chlorate is left in the caustic phase. The caustic liquor will not be substantially concentrated or diluted since liquid ammonia of the above dilution is approximately the equilibrium mixture and will absorb substantially no water therefrom.

In addition, it is found that caustic of high concentration, for example, 40 percent and above will be in equilibrium with ammonia-water mixtures of low caustic content. It will be understood that each liquid phase which is separated will contain ammonia, water and sodium hydroxide in some concentration. Caustic solutions of low concentration, for example, 20 percent, are in equilibrium with ammonia-water mixtures containing upward to 40 percent sodium hydroxide. It will be apparent that, if it is attempted to treat such a solution with ammonia-water mixtures of such composition that substantially no concentration occurs, a large portion of the sodium hydroxide will pass into the opposing layer with consequent dilution of the liquor being treated. Solutions of high concentration (40 percent or above) are in equilibrium with ammonia-water mixtures containing very small amounts of sodium hydroxide and an efficient purification can be secured without substantial movement of caustic into the other liquid phase.

In addition, as previously pointed out, the distribution ratio is such that the major portion of the impurities pass into the upper more dilute phase. When solutions of high concentration, for example, 40 percent and above, are treated with ammonia-water mixtures substantially in equilibrium therewith, the solution being treated remains as the lower layer, the major portion of the impurities moving into the ammonia liquor. On the other hand, solutions of low concentration, for example, 20–30 percent, when treated with ammonia liquors of such NaOH and water content that no substantial concentration thereof is obtained, the solution being treated becomes the upper layer thereby retaining the major portion of the chloride and chlorate impurities and losing only minor portions of the same.

By this means I am able to effect purification in an effective and inexpensive manner without substantial concentration. In such an operation, the caustic is treated with ammonia or ammonia-water mixtures of such water content that no substantial quantity of water is absorbed from the caustic. Thus, anhydrous caustic or hydrated caustic of high hydroxide content may be purified (in general, upwards of 40 percent) by treatment with liquid ammonia containing the predetermined quantity of water necessary to form the equilibrium mixture and hence to prevent substantial concentration of the caustic. The temperature and pressures may be widely varied, but the ammonia in contact with the caustic must be in the liquid state.

The caustic, after it has been treated with liquid ammonia in accordance with my invention is much less corrosive and has a lesser tendency to attack iron containers in which it may be stored. Certain impurities other than sodium chloride appear to contribute to the corrosive properties of the caustic, for example, my experiments indicate that sodium chlorate increases the corrosive nature of the caustic even when present in small amounts. Since by operating in accordance with my invention I can remove from caustic not only sodium chloride but sodium chlorate and other impurities, I am enabled to produce a caustic which is not so corrosive and therefore not so easily contaminated as the prior art caustics.

The following examples illustrate my invention:

*Example I.*—Two parts by weight of electrolytic caustic soda having the following analysis:

|  | Percent |
|---|---|
| Caustic (approx.) | 50 |
| NaCl | 1.03 |
| $NaClO_3$ | 0.45 | was mixed vigorously with five parts by weight of liquid ammonia consisting of 75 percent anhydrous ammonia and 25 percent water at a temperature of 65° C. The analysis of the caustic liquor produced was

|  | Percent |
|---|---|
| Caustic (approx.) | 50 |
| NaCl | 0.04 |
| $NaClO_3$ | 0.00 |

The purified caustic was then tested for corrosiveness and found to be no more corrosive than caustic produced by the ammonia-soda process of the same concentration. Since electrolytic caustic is usually more corrosive than ammonia-soda caustic, it is apparent that certain corrosion-promoting substances have been removed.

*Example II.*—Two parts by weight of caustic soda having the following analysis:

|  | Percent |
|---|---|
| Caustic (approx.) | 60 |
| NaCl | 0.95 |
| $NaClO_3$ | 0.38 | was mixed vigorously with 4 parts by weight of liquid ammonia consisting of 83 percent anhydrous ammonia, and 17 percent water at a temperature of 65° C. The analysis of the caustic liquor produced was

|  | Percent |
|---|---|
| Caustic (approx.) | 60 |
| NaCl | 0.09 |
| $NaClO_3$ | 0.00 |

The resultant product was found to be much less corrosive than the original electrolytic caustic liquor.

*Example III.*—Two parts by weight of approximately 50 percent caustic derived from the ammonia-soda process and containing 0.25 percent sodium chloride was treated with two parts by weight of liquid ammonia comprising 75 percent ammonia and 25 percent water and a product of approximately 50 percent caustic containing 0.06 percent sodium chloride was obtained.

The process of the present invention is adapted primarily to the purification of caustic of approximately 50 percent concentration or higher. At low concentrations, the caustic liquors, especially those produced by the electrolytic process, contain large amounts of sodium chloride and other impurities often running as high as 15 percent of the total liquor. If such solutions are treated with liquid ammonia containing sufficient water to inhibit concentration of the liquors, some sodium chloride may dissolve in the ammonia phase, but the quantity of this and other salts removed will be so small that no effective purification will be secured.

With caustic of 40 to 50 percent concentration and higher, although the content of salt and other impurities is lower, an effective removal of all or of all but unimportant amounts thereof can be effected by operating in accordance with the present invention.

In most cases, it is not vital to so exactly adjust the ammonia-water ratio that absolutely no concentration or dilution occurs. Usually, it is only necessary to treat the caustic with an ammonia liquor of such degree of hydration that approximately no concentration is effected and a leeway of one or two percent or even as much as five percent may be permissible in some cases. Since purification is the primary object, however, the production of a highly concentrated product is not absolutely essential as it may then be necessary to dilute again to the original concentration. As previously noted, however, the process may be conducted in a manner such that a concentrated solution is produced, if desired. This may be done by utilizing substantially anhydrous liquid ammonia or liquid ammonia containing only a minor quantity of water. Further details of this process have been described in my copending applications 93,022 and 179,334, previously referred to.

Various means may be resorted to in order to obtain the intimate contact between the caustic and ammonia. For example, a countercurrent process such as shown and described in my copending application, filed of even date herewith, Serial No. 179,334, may be used or the process may be carried out countercurrently in several stages, or repeated treatment with fresh liquor may be used, or the process may be effected by one or several batch treatments. Other variations will occur to one skilled in the art.

The caustic may be in the liquid or solid state. If desired, the caustic might be added as a solid, liquefied during the purification to mix with the ammonia, and subsequently recrystallized in the processing equipment, or the solid caustic may be maintained in solid form during the entire procedure. Thus, in the treatment of anhydrous caustic with ammonia, the caustic would, in general, though not necessarily, be maintained in the solid state throughout the whole process. If solid caustic is to be purified as such, however, it is advisable to add it to the ammonia in a very finely divided state in order to insure intimate contact with the liquor.

Especially pure caustic can be produced by washing with a liquid ammonia liquor and crystallizing out, or causing to solidify, a solid caustic in the same process. This can be done, for example, by careful regulation of the temperature so that at some time in the treatment, the caustic is brought down to a temperature slightly below its solidification point at which point solidification will occur. Seeding to facilitate such solidification is within the purview of my invention. Under such conditions, I can combine purification by ammonia washing and by solidification so effectively that an extremely pure product is the result. Solidification can be carried out either in the presence of the ammonia liquor, or the ammonia liquor may be removed before solidification.

As a further modification the process may be conducted in manner such that the solution is purified and diluted simultaneously. For example, having secured a purified concentrate of about 40–50 percent strength, I can precipitate the 3½ hydrate by treating with ammonia of such water content that dilution of the caustic takes place to the point where the 3½ hydrate will be formed.

My purification process can be used in conjunction with any of the conventional purification processes in order to attain very high purity. For example, the purified liquor obtained from the ammonia purification step may then be subjected to treatment with lime to remove any iron which may be present.

The process is not limited to purification of caustic soda alone, but is adapted to the purification of other alkali metal hydroxides. Chlorine compounds and other impurities may be removed from potassium and lithium hydroxides by treatment with liquid ammonia in the manner heretofore described.

Although the present invention has been described in connection with the specific details of certain embodiments thereof, it is not intended that such details shall be regarded as limitations upon the scope of the invention except insofar as included in the accompanying claims.

By the terms "hydrated alkali metal hydroxide" and "hydrated sodium hydroxide" in the appended claims, I mean to include both solid hydroxides containing water, and aqueous solutions of the respective hydroxides.

I claim:

1. The method of purifying solid hydrated sodium hydroxide containing an impurity of the group consisting of chloride and chlorate which comprises extracting the same while in the solid state with liquid ammonia containing sufficient water to prevent substantial dehydration of said solid by the liquid ammonia, the amount of ammonia present during treatment being sufficient to insure the existence of a liquid phase containing a major portion of the ammonia and a second phase containing a major portion of said hydroxide.

2. The process of purifying solid hydrated sodium hydroxide containing an impurity of the group consisting of chloride and chlorate which comprises liquefying said hydroxide and washing the melted product with liquid ammonia containing sufficient water to inhibit substantial concentration of the melt by the liquid ammonia, the amount of ammonia present during treatment being sufficient to insure the existence of a liquid phase containing a major portion of the ammonia and a second phase containing a major portion of said hydroxide.

3. The process of purification which comprises washing hydrated sodium hydroxide containing an impurity of the group consisting of chloride and chlorate having a concentration of not substantially less than 40–50 percent with liquid ammonia containing sufficient water to inhibit substantial concentration of the hydroxide due to the liquid ammonia, the amount of ammonia present during treatment being sufficient to insure the existence of a liquid phase containing a major portion of the ammonia and a second phase containing a major portion of said hydroxide.

4. The process of purifying hydrated sodium hydroxide containing an impurity of the group consisting of chloride and chlorate which comprises washing hydrated sodium hydroxide having a concentration of not substantially less than 40–50 percent, with liquid ammonia containing sufficient water to inhibit substantial concentration by the liquid ammonia and precipitating out a solid hydroxide, the amount of ammonia present during treatment being sufficient to insure the existence of a liquid phase containing a major portion of the ammonia and a second phase containing a major portion of said hydroxide.

5. The process of purifying hydrated sodium hydroxide containing an impurity of the group consisting of chloride and chlorate which comprises washing said hydroxide with liquid ammonia containing sufficient water to inhibit substantial concentration by the liquid ammonia and precipitating out a solid hydroxide during said washing, the amount of ammonia present during treatment being sufficient to insure the existence of a liquid phase containing a major portion of the ammonia and a second phase containing a major portion of said hydroxide.

6. The process of purifying hydrated alkali metal hydroxide containing an impurity of the group consisting of chloride and chlorate which comprises washing the same with liquid ammonia containing sufficient water to prevent any substantial concentration of the alkali metal hydroxide by the liquid ammonia, the amount of ammonia present during treatment being sufficient to insure the existence of a liquid phase containing a major portion of the ammonia and a second phase containing a major portion of said hydroxide.

7. The process of purifying hydrated alkali metal hydroxide containing an impurity of the group consisting of chloride and chlorate which comprises washing the same with liquid ammonia and sufficient water to inhibit substantial concentration by the liquid ammonia and precipitating out a solid hydroxide, the amount of ammonia present during treatment being sufficient to insure the existence of a liquid phase containing a major portion of the ammonia and a second phase containing a major portion of said hydroxide.

8. The method of reducing the corrosive character of electrolytically produced sodium hydroxide containing an impurity of the group consisting of chloride and chlorate which comprises concentrating hydrated sodium hydroxide formed by an electrolytic process to a concentration of substantially about 40–50 percent, contacting it with liquid ammonia containing about 25 percent of water and separating the ammonia-water phase, thereby effecting substantially complete removal of chlorate compounds from the hydroxide.

9. The process of purifying hydrated sodium hydroxide containing an impurity of the group consisting of chloride and chlorate which comprises washing hydrated sodium hydroxide having a concentration of not substantially less than 40–50 percent with liquid ammonia containing sufficient water to cause dilution of the hydrated sodium hydroxide to somewhat below 40 percent and precipitating a solidified sodium hydroxide hydrate from the resulting solution, the amount of ammonia present during treatment being sufficient to insure the existence of a liquid phase containing a major portion of the ammonia and a second phase containing a major portion of said hydroxide.

10. A process of purifying hydrated sodium hydroxide containing sodium hydroxide in concentrations of 40 percent and above and sodium chloride as an impurity which comprises treating said hydroxide with a material of the group consisting of liquid ammonia and mixture of liquid ammonia and water, and removing said ammonia together with at least a portion of said impurity, the amount of ammonia present during treatment being at least sufficient to cause separation of a liquid phase containing a major portion of the ammonia from a second liquid phase containing a substantial portion of said hydroxide.

11. A process of purifying hydrated sodium hydroxide produced by an electrolytic process and containing chlorate as an impurity which comprises treating hydrated sodium hydroxide containing not substantially less than 40 percent sodium hydroxide with a material of the group consisting of liquid ammonia and mixtures of liquid ammonia and water, and removing said ammonia together with at least a portion of said impurity, the amount of ammonia present during treatment being at least sufficient to cause separation of a liquid phase containing a major portion of the ammonia from a second liquid phase containing a substantial portion of said hydroxide.

12. A process of purifying sodium hydroxide solutions containing a chloride as an impurity therein which comprises concentrating said solution to 45-50 percent, permitting a portion of said impurity to separate out of solution, removing said separated impurity and treating the purified solution with a material of the group consisting of liquid ammonia and mixtures of liquid ammonia and water, and removing said ammonia together with a further quantity of said impurity from said solution, the amount of ammonia present during treatment being at least sufficient to cause separation of a liquid phase containing a major portion of the ammonia from a second liquid phase containing a substantial portion of said hydroxide.

13. A process of purifying alkali metal hydroxide solutions containing a chloride as an impurity therein which comprises concentrating said solution to 45-50 percent, permitting a portion of said impurity to separate out of solution, removing said separated impurity and treating the purified solution with a material of the group consisting of liquid ammonia and mixtures of liquid ammonia and water, and removing said ammonia together with a further quantity of said impurity from said solution, the amount of ammonia present during treatment being at least sufficient to cause separation of a liquid phase containing a major portion of the ammonia from a second liquid phase containing a substantial portion of said hydroxide.

14. A process of purifying hydrated alkali metal hydroxides produced by an electrolytic process and containing an impurity of the group consisting of chloride and chlorate which comprises treating an hydrated alkali metal hydroxide containing not substantially less than 40 percent of said hydroxide with a material of the group consisting of liquid ammonia and mixtures of liquid ammonia and water and removing said ammonia together with at least a portion of said impurity, the amount of ammonia present during treatment being at least sufficient to cause separation of a liquid phase containing a major portion of the ammonia from a second liquid phase containing a substantial portion of said hydroxide.

15. A process of purifying an aqueous solution of sodium hydroxide produced by an electrolytic process and containing chlorate as an impurity which comprises treating a solution containing not substantially less than 40 percent of said hydroxide with a material of the group consisting of liquid ammonia and mixtures of liquid ammonia and water, and removing said ammonia together with at least a portion of said impurity, the amount of ammonia present during treatment being at least sufficient to cause separation of a liquid phase containing a major portion of the ammonia from a second liquid phase containing a substantial portion of said hydroxide.

16. A process of purifying an aqueous solution of an alkali metal hydroxide produced by an electrolytic process and containing chlorate as an impurity which comprises treating a solution containing not substantially less than 40 percent of said hydroxide with a material of the group consisting of liquid ammonia and mixtures of liquid ammonia and water, and removing said ammonia together with at least a portion of said impurity, the amount of ammonia present during treatment being at least sufficient to cause separation of a liquid phase containing a major portion of the ammonia from a second liquid phase containing a substantial portion of said hydroxide.

17. A process of removing sodium chloride from aqueous solutions of electrolytic caustic soda which comprises treating a solution thereof having an initial caustic concentration of not substantially less than 50 percent with a material of the group consisting of liquid ammonia and mixtures of liquid ammonia and water, the amount of ammonia present during treatment being at least sufficient to cause separation of a liquid phase containing a major portion of the ammonia from a second liquid phase containing a substantial portion of said hydroxide.

18. A process of purifying an aqueous solution of sodium hydroxide containing sodium hydroxide in concentrations of 40 percent and above and sodium chloride as an impurity which comprises treating said solution with a material of the group consisting of liquid ammonia and mixtures of liquid ammonia and water, and removing said ammonia together with at least a portion of said impurity, the amount of ammonia present during treatment being at least sufficient to cause separation of a liquid phase containing a major portion of the ammonia from a second liquid phase containing a substantial portion of said hydroxide.

19. A process of purifying an aqueous solution of sodium hydroxide which contains sodium chloride as an impurity, which comprises adding a material of the group consisting of liquid ammonia and mixtures of liquid ammonia and water, the amount of ammonia present being sufficient to insure the existence of a liquid phase containing a major portion of the ammonia and a second liquid phase containing a major portion of said hydroxide, crystallizing out solid hydroxide from said second phase in the presence of said first phase and recovering said solid.

20. A method of purifying aqueous sodium hydroxide prepared by an electrolytic process and containing a substantial quantity of sodium chloride which comprises concentrating said hydroxide while permitting a portion of the sodium chloride to separate out of solution, removing the separated sodium chloride and treating the purified hydroxide with a material of the group consisting of liquid ammonia and mixtures of liquid ammonia and water and removing said ammonia together with at least a portion of the sodium chloride, the amount of ammonia present during the treatment being at least sufficient to cause separation of a liquid phase containing a major portion of the ammonia from a second liquid phase containing a substantial portion of said hydroxide.

IRVING E. MUSKAT.